US008228172B2

(12) United States Patent  
Collins et al.

(10) Patent No.: US 8,228,172 B2  
(45) Date of Patent: Jul. 24, 2012

(54) RFID TAG DEVICE WITH TEMPERATURE SENSITIVE ANTENNA

(75) Inventors: Timothy Collins, Homer Glen, IL (US); Andreas Schaller, Wiesbaden (DE); Benjamin Bekritsky, Hollis, NY (US); Theodore Hockey, Mount Airy, MD (US)

(73) Assignee: Motorola Solutions, Inc., Schaumburg, IL (US)

( * ) Notice: Subject to any disclaimer, the term of this patent is extended or adjusted under 35 U.S.C. 154(b) by 665 days.

(21) Appl. No.: 12/241,469

(22) Filed: Sep. 30, 2008

(65) Prior Publication Data

US 2010/0079288 A1    Apr. 1, 2010

(51) Int. Cl.  
*G08B 21/00*    (2006.01)

(52) U.S. Cl. ............... 340/10.1; 340/10.4; 340/10.41; 340/572.2; 340/572.4; 343/745

(58) Field of Classification Search .......... 343/700, 343/745; 340/572, 10  
See application file for complete search history.

(56) References Cited

U.S. PATENT DOCUMENTS

| 5,021,795 | A  | * | 6/1991  | Masiulis .............. 343/700 MS |
| 5,448,110 | A  | * | 9/1995  | Tuttle et al. ............... 257/723 |
| 6,107,920 | A  | * | 8/2000  | Eberhardt et al. ......... 340/572.7 |
| 6,403,222 | B1 | * | 6/2002  | Harrison .................. 428/418 |
| 2004/0061655 | A1 | * | 4/2004 | Forster et al. .............. 343/767 |
| 2005/0242957 | A1 | * | 11/2005 | Lindsay et al. ........... 340/572.7 |
| 2006/0244606 | A1 | * | 11/2006 | Li et al. ................ 340/572.7 |

* cited by examiner

*Primary Examiner* — Jennifer Mehmood  
*Assistant Examiner* — Mark Rushing  
(74) *Attorney, Agent, or Firm* — Bartholomew J. DiVita; Terri Hughes Smith; Steven A. May (57) ABSTRACT

An apparatus system, and techniques for detecting temperature change are disclosed. The system includes a temperature sensitive antenna that can be included in an RFID tag device. The antenna is associated with a temperature sensitive material that, upon being exposed to a particular temperature level over a time interval, causes at least one of a change in the resonance frequency of the antenna and change in antenna signal strength (e.g., antenna gain). An RFID reader is also provided that sends commands to the tag device and determines the existence of a temperature change based on a comparison of signal strengths received on different frequencies from the antenna.

22 Claims, 6 Drawing Sheets

RFID TAG DEVICE WITH TEMPERATURE SENSITIVE ANTENNA

TECHNICAL FIELD

This disclosure relates to the field of radio frequency identification (RFID) and, more particularly to an RFID tag device, system, and techniques for identifying temperature changes.

BACKGROUND

Radio Frequency Identification (RFID) systems have become increasingly prevalent over the years. These systems can be used to identify people as well as objects. Typically, the systems include at least one RFID reader that transmits and receives radio frequency (RF) signals from one or more RFID tags within a predefined range. The RFID tags tend to be compact packages that are attachable to an object and include a microchip that is in communication with an antenna. The microchip is typically an integrated circuit for storing and processing information, modulating and demodulating the RF signal, and performing other specialized functions. The antenna of the tag is used for receiving and transmitting the RF signal and is usually tuned to a particular frequency.

In some implementations, RFID systems have been deployed with temperature sensing devices to detect when the temperature of a product, such as a perishable food item, exceeds a desired temperature. Typically, these implementations require that the sensing device (e.g. a thermister) have a continuous power source to detect a temperature change which adds to the cost of implementations. In addition, some implementations require that the sensing device also be connected to a comparator circuit to determine how far above or below a reference voltage is further adding to the cost of implementations. Accordingly, there is a need for an improved RFID system that can detect temperature change without use of a continuous power source or additional circuitry in a cost effective manner.

SUMMARY

An apparatus, system, and techniques for detecting temperature change are disclosed. The system includes a temperature sensitive antenna that can be included in an RFID tag device. The antenna is associated with a temperature sensitive material that, upon being exposed to a particular temperature level over a time interval, causes at least one of a change in the resonance frequency of the antenna and change in antenna signal strength (e.g., antenna gain). An RFID reader is also provided that sends commands to the tag device and determines the existence of a temperature change based on a comparison of signal strengths received on different frequencies from the antenna.

Various aspects of the system relate to transmitting and receiving electromagnetic signals using a temperature sensitive antenna. For example, according to one aspect, an antenna apparatus includes a first antenna tuned to a first resonant frequency to transmit and receive electromagnetic signals. The first antenna is associated with a temperature sensitive material that, upon the apparatus being exposed to a particular temperature level over a predefined time interval, causes a shift in the first resonant frequency. Preferably, the temperature sensitive material is a low resistive material. For example, in one embodiment, the conductive temperature sensitive material is a graphite-based composition. In another embodiment, the temperature sensitive material is pentadecan. In yet another embodiment, the temperature sensitive material is polyethylene glycol.

In one embodiment, upon the apparatus being exposed to the particular temperature level over the predefined time interval, a gain of the first antenna is changed.

In another embodiment, the antenna apparatus also includes a second antenna tuned to a second resonant frequency. The second antenna is formed from a low resistive material such that, upon the apparatus being exposed to the particular temperature level over the predefined time interval, the second antenna maintains its second resonant frequency and/or its signal strength. In one embodiment, the first and second antennas are arranged to form a dual dipole antenna. The first antenna can be formed from the temperature sensitive material or be attached to the temperature sensitive material.

In another aspect, a Radio Frequency Identification (RFID) tag device includes a substrate, an integrated circuit mounted on the substrate, and a first antenna in communication with the integrated circuit tuned to a first resonant frequency to transmit and receive electromagnetic signals. The first antenna is associated with a temperature sensitive material that, upon the tag device being exposed to a particular temperature level over a predefined time interval, causes a shift in the first resonant frequency.

Preferably, the temperature sensitive material is a low resistive material. For example, in one embodiment, the conductive temperature sensitive material is a graphite-based composition. In another embodiment, the temperature sensitive material is pentadecan. In yet another embodiment, the temperature sensitive material is polyethylene glycol.

In one embodiment, upon the tag device being exposed to the particular temperature level over the predefined time interval, a gain of the first antenna is changed.

In another embodiment, the RFID tag device further includes a second antenna tuned to a second resonant frequency. The second antenna is preferably formed from a low resistive material such that, upon the tag device being exposed to said particular temperature level over said predefined time interval, the second antenna maintains at least one of the second resonant frequency and its gain.

In one embodiment, the first and second antennas of the RFID device form a dual dipole antenna. Either the first or second antennas can also be formed from the temperature sensitive material. In one embodiment, the temperature sensitive material is a tuning element in communication with the first antenna.

In another aspect, a method of detecting a temperature change using electromagnetic waves includes calculating a comparison value between a first signal strength value associated with a first signal received from an RFID tag device and a second signal strength value associated with a second signal received from said RFID tag device, and correlating the comparison value to a temperature level.

The method can also include radiating the first signal from a first antenna included in the RFID tag device, and radiating the second signal from a second antenna included in the RFID tag device. The second antenna being associated with a temperature sensitive material that, upon the tag device being exposed to a particular temperature level over a predetermined period of time, causes at least one of the second signal strength to be different from the first signal strength and a second resonant frequency of the second antenna to be different from a first resonant frequency of the first antenna.

In one embodiment, the method of correlating the comparison value includes comparing the comparison value to a plurality of signal strength values at different frequencies associated with a plurality of temperature points, and determining the temperature level based on said comparison.

In yet another aspect, a Radio Frequency Identification (RFID) system includes an RFID tag device configured to send a first signal including a first signal strength value and a second signal including a second signal strength value in response to at least one request, and a RFID reader device configured to send the at least one request to the RFID tag device. The reader device is configured to i) calculate a comparison value between the first signal strength value associated with the first signal received from the tag device and the second signal strength value associated with the second signal, and ii) correlate the comparison value to a temperature level or difference.

In one embodiment, the tag device radiates the first signal from a first antenna, and radiates the second signal from a second antenna. The first and second antennas are included in the RFID tag device. Preferably, the second antenna is associated with a temperature sensitive material that, upon the tag device being exposed to a particular temperature level over a predetermined period of time, causes the second signal strength value to be different from the first signal strength value due to the resonant frequency shift.

Additional features and advantages will be readily apparent from the following detailed description, the accompanying drawings and claims.

BRIEF DESCRIPTION OF DRAWINGS

Like reference symbols in the various drawings indicate like elements.

DETAILED DESCRIPTION

Figure 1:
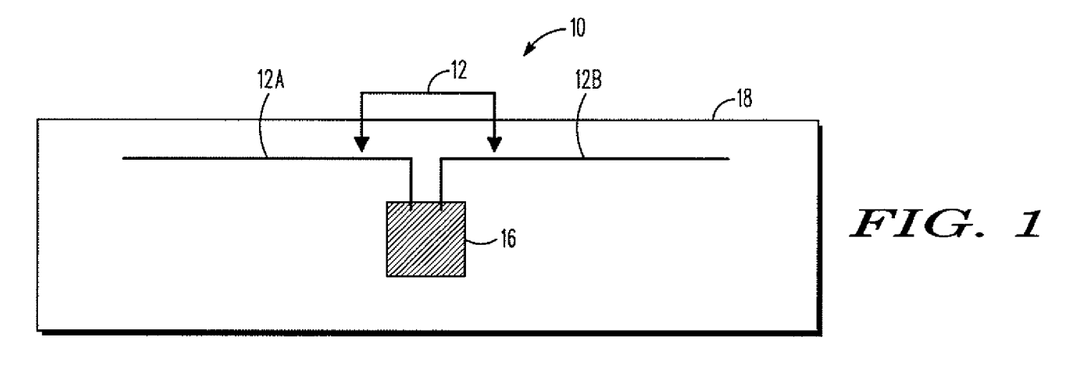
FIG. 1 is a schematic of an RFID tag device according to a first embodiment of the present invention.

Referring now to FIG. 1, a schematic of an RFID tag device 10 capable of determining a temperature change without a continuous power source is disclosed. As shown in FIG. 1, the tag device 10 preferably includes a substrate 18 comprising an integrated circuit 16 and an antenna 12 mounted thereto. In the embodiment shown in FIG. 1, the antenna 12 is a single dipole antenna including two conductors or radiators 12A, 12B configured to send and receive electromagnetic signals to a RFID reader. Although various embodiments of the present invention described below discuss use of a dipole antenna, it will be appreciated by one skilled in the art that the present invention is not limited to a dipole antenna implementation and that other types of antennas can be utilized.

In one embodiment, radiators 12A, 12B are formed from one or more different low resistive materials having a high Q characteristic, such as copper, silver, and aluminum which are combined with temperature sensitive material such that, upon the antenna 12 being exposed to a particular temperature level over a predefined time interval, the temperature sensitive material causes a shift in one or more radiators resonant frequency resulting in a different frequency. The frequency change can be different for either the Rx or Tx. For example, exposure of the temperature sensitive material to a particular temperature level over a predefined time interval can result in a change in frequency of either the Rx, Tx, or both Rx and Tx.

In one embodiment, the frequency of the antenna is set at a value higher prior to the antenna being exposed to a temperature level and then is lowered upon the temperature level being reached. In another embodiment, the frequency of the antenna is set at a lower value prior to the antenna being exposed to the temperature level and set higher when the temperature level is reached. Examples of temperature sensitive materials that can be used with the present invention include graphite-based compositions, pentadecan, and polyethylene glycol.

Depending on the type of temperature sensitive material and amount, the temperature level that causes the shift can be a particular temperature value or alternatively, a range of temperature values. The amount of time necessary to affect a change in the resonant frequency of the antenna also can be varied based on various antenna qualities. For example, in one embodiment, the amount of temperature sensitive material included in antennas and/or associated with antennas can affect the amount of time required for a change in antenna resonance.

Figure 2:
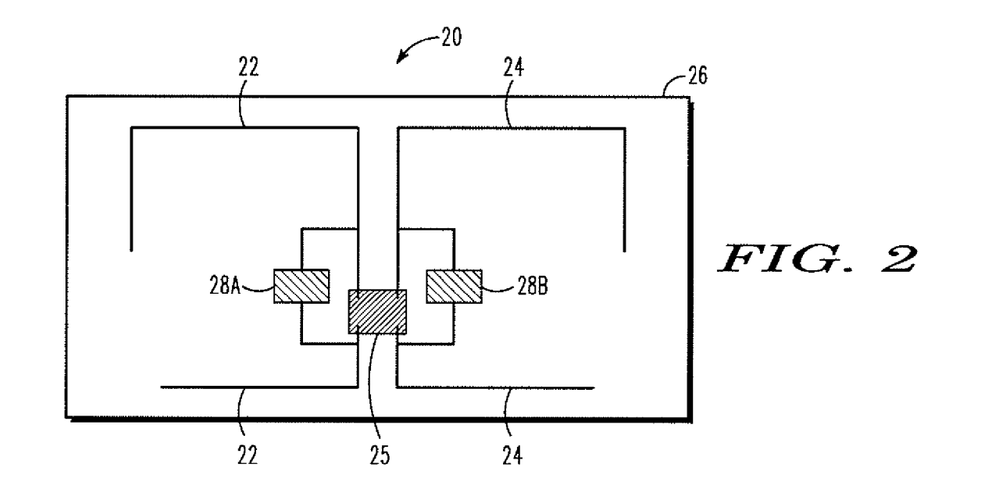
FIG. 2 is a schematic of an RFID tag device according to a second embodiment of the present invention.

Turning now to FIG. 2, a second embodiment of an RFID tag device 20 is disclosed. As shown in FIG. 2, the tag device 20 includes a substrate 26, integrated circuit 25, and a dual dipole antenna 22, 24. The impedance of each of the antennas 22, 24 is affected by tuning elements 28A, 28B that are associated with each of the antennas 22, 24. The tuning elements 28A, 28B operate to control the ratio at any given point along each antenna 22, 24 of voltage to current. In one embodiment, the antennas 22, 24 are configured to resonate at a same frequency. In another embodiment, the antennas 22, 24 are configured to radiate at different resonance frequencies.

Similar to the embodiment shown in FIG. 1, the antennas 22, 24 of the device 20 can be formed from one or more different low resistive materials having a high Q characteristic, such as copper, silver or aluminum, which are combined with temperature sensitive material. Upon the tag device 20 being exposed to a particular temperature level over a predefined time interval, the resonant frequency of one or both of the antennas can be changed based on the amount of temperature sensitive material used in forming the antennas or alternatively, the amount of temperature sensitive material associated with the antennas. For example, in one embodiment, temperature sensitive material is overlaid on the antennas.

Figure 7A:
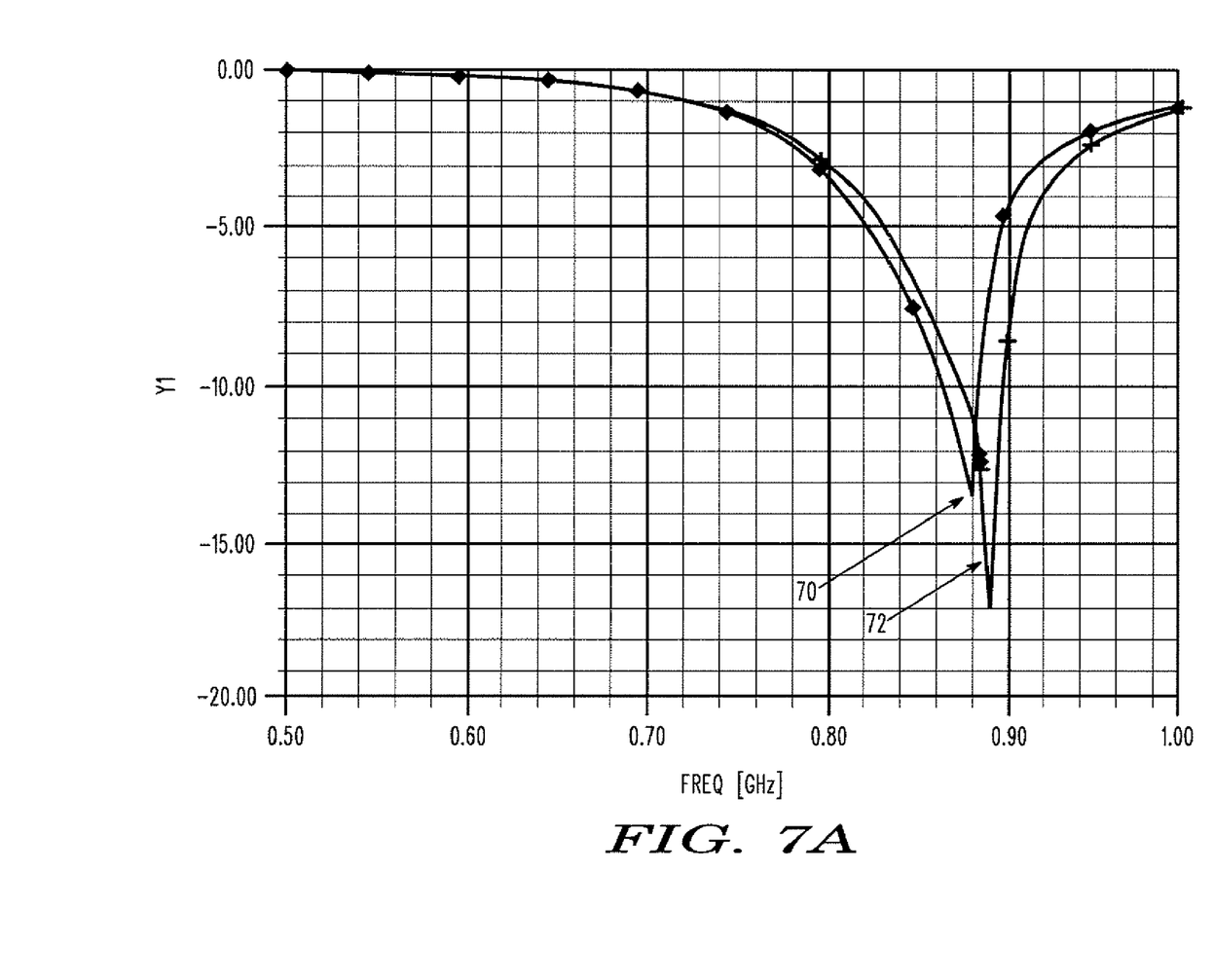
FIGS. 7A-B illustrates example resonance frequencies using an antenna of the present invention.
Figure 7B:
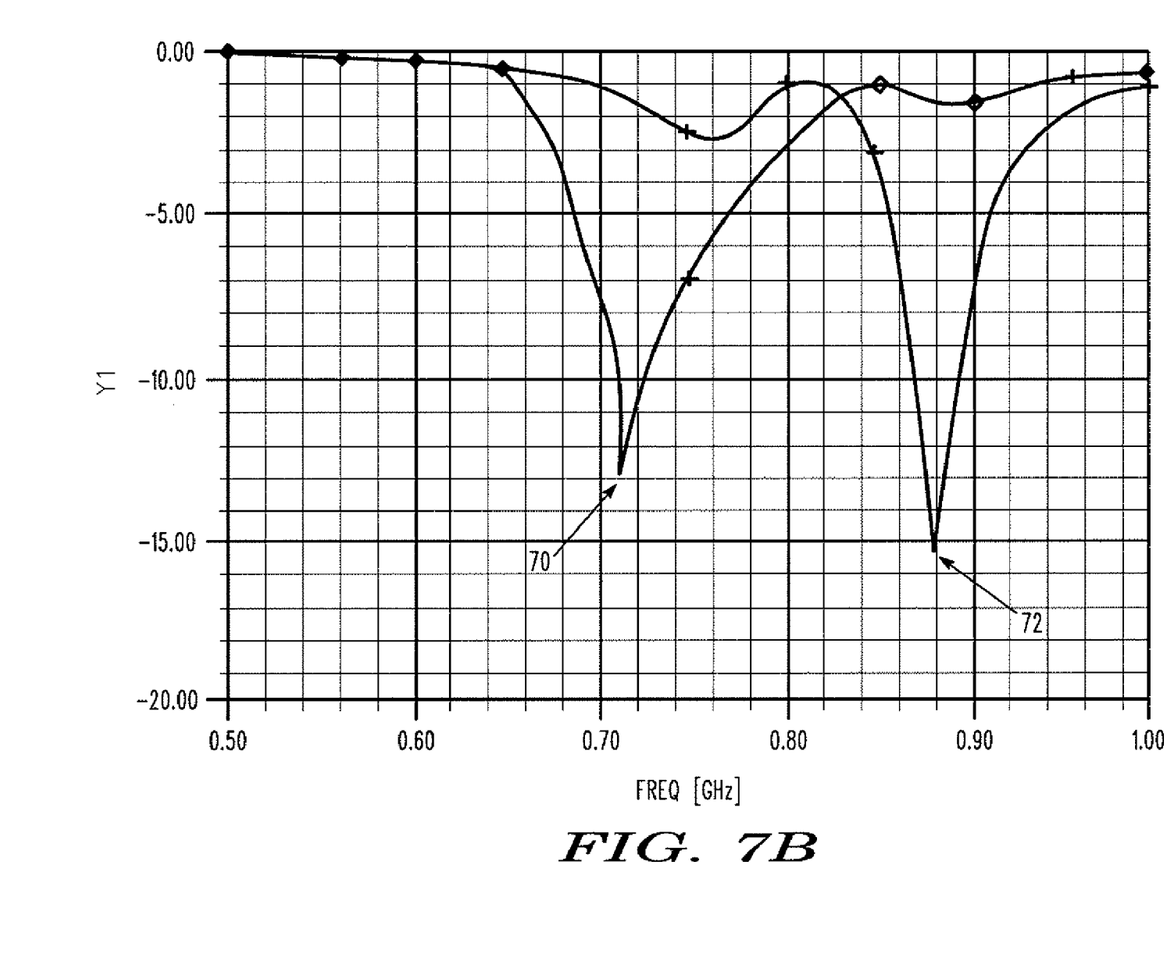

An example of the change in resonant frequency in response to the tag device 20 being exposed to a particular temperature level is shown in connection with FIGS. 7A-B. As shown in FIG. 7A, in one embodiment, prior to exposure of the antennas to a particular temperature level, the frequencies 70, 72 of each of the antennas is set approximately the same (i.e., 0.90 GHz). Upon exposure to the particular temperature level, as shown in FIG. 7B, the resonant frequency 70 of one of the antennas associated with the temperature sensitive material is lowered to approximately 0.70 Ghz while the antenna not associated with the temperature sensitive material maintains its resonant frequency at approximately 0.90 Ghz. Note that the optimum antenna gains can be associated at each resonant frequency Turning now to FIG. 3, another embodiment of an RFID tag device 30 using a temperature sensitive antenna is disclosed. Each of the antennas 32, 34 are formed from a same low resistive material, such as copper. Similar to the embodiment shown in FIG. 2, the impedance of each antenna 32, 34 is affected by tuning elements 38A, 38B. One of the tuning elements 38B, however, includes the temperature sensitive material. Upon the tag 30 being exposed to a particular temperature level over a predefined time interval, the tuning element 38B associated with the temperature sensitive material operates to cause a frequency shift in the antenna 34 associated with that tuning element 38B.

Figure 3:
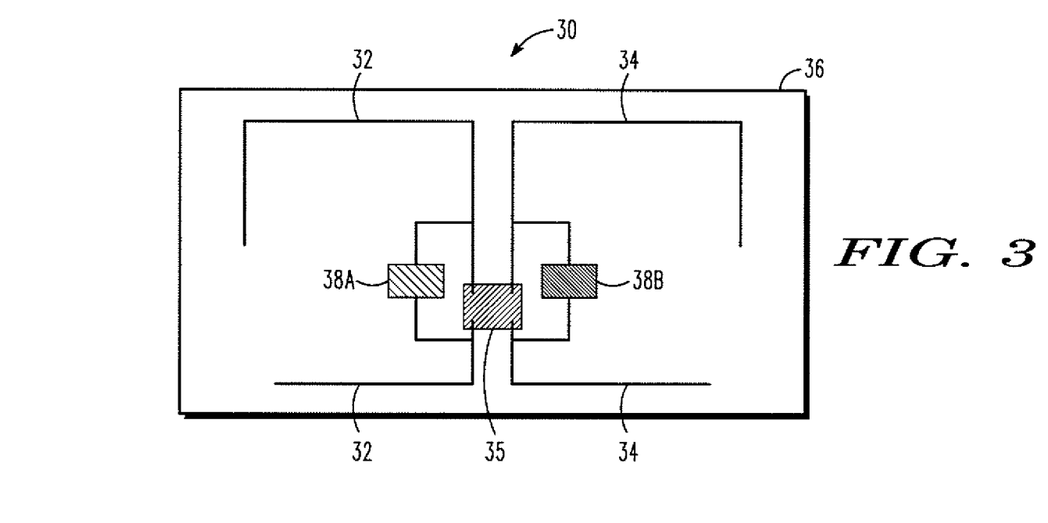
FIG. 3 is a schematic of an RFID tag device according to a third embodiment of the present invention.

It will be appreciated by one skilled in the art that the present invention is not limited to use of two tuning elements and can include more than two tuning elements each of which can be associated with temperature sensitive material. Each of the elements can be designed so that the temperature sensitive material is affected at a different temperature level to detect a range of temperatures. In one embodiment, the temperature sensitive material is designed such that the resistivity of the material changes between a wide range of temperature and time intervals.

The elements can also be designed such that exposure to a particular temperature level over a predefined time interval results in no electromagnetic waves being transmitted by one or more antennas of the device.

Figure 4:
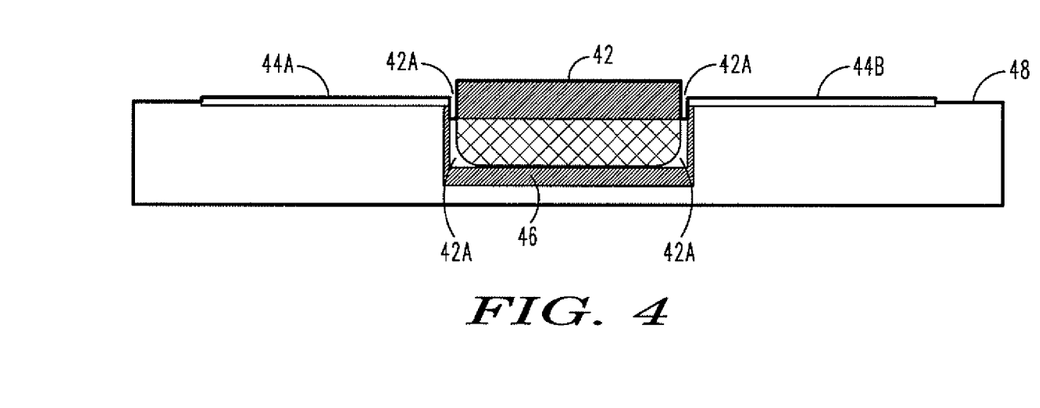
FIG. 4 is a schematic side view of a sensor prior to a temperature level exposure.
Figure 5:
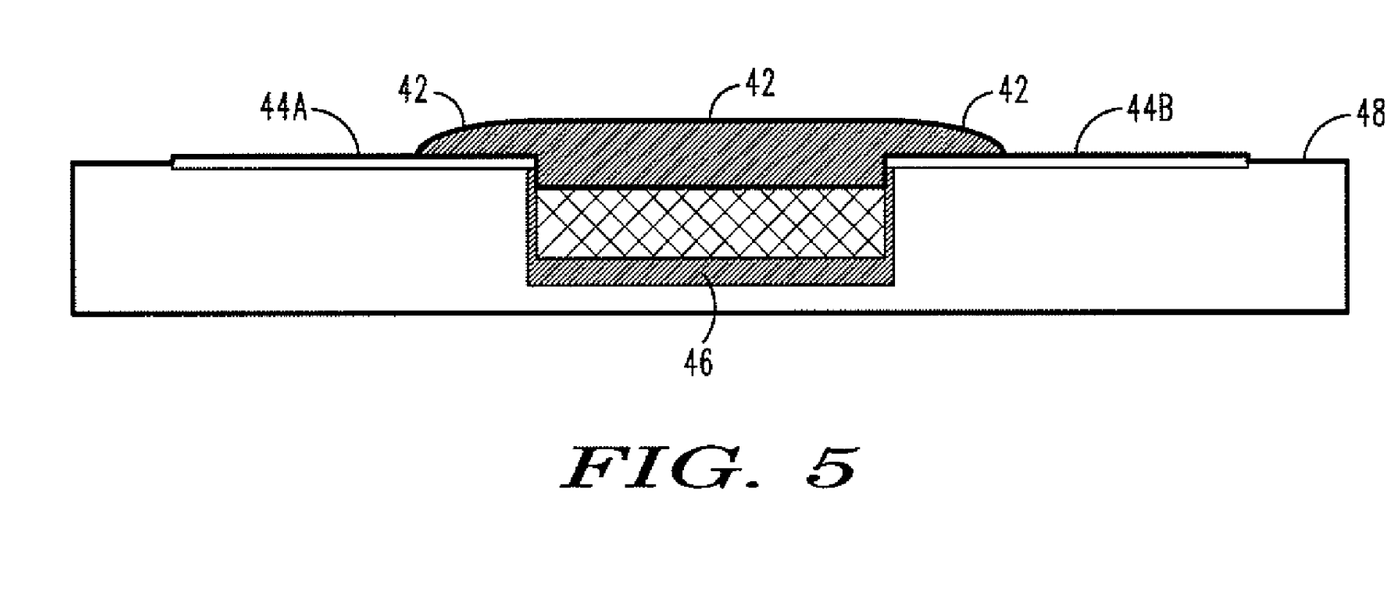
FIG. 5 is a schematic side view of the sensor of FIG. 4 subsequent to the temperature level exposure.

Turning now to FIGS. 4 and 5, an example of a temperature sensor 40 including the temperature sensitive material 42 of the present invention is disclosed. In one embodiment, the sensor 40 includes a substrate 48 fabricated from a silica gel formed on a polyester foil. The sensor 40 also includes conductive silver ink portions 44A, 44B that connect to an antenna.

As shown in the FIG. 4 example, in one embodiment, substrate 48 also includes a receiving area 42A between the silver ink portions 44A, 44B to receive the temperature sensitive material 42, such as a graphite powder. As shown in FIG. 4, the receiving area 42A can be shaped and sized to include side and bottom walls 46 to receive the temperature sensitive material 42. Of course, it will be appreciated by one skilled in the art that receiving area 42A need not include bottom and/or sidewalls and can be an area between the silver ink portions 44A, 44B. For example, in one embodiment, receiving area 42A is on a parallel plane positioned between the silver ink portions 44A, 44B that connect to the antenna and alters the resonant frequencies based on their length.

Referring to FIG. 5, upon the substrate 48 being exposed to a particular temperature level over a time interval, chemical and/or physical properties of the temperature sensitive material 42 are altered to affect a shift in the resonance of the silver ink portions 44A, 44B. For example, in one embodiment, upon the temperature sensitive material 42 being exposed to a temperature level over a predetermined time interval, the temperature sensitive material 42 connects the silver ink portions 44A, 44B changing the electrical characteristics of the ink portions 44A, 44B. In one embodiment, upon the material 42 connecting to the silver ink portions 44A, 44B, the silver ink portions 44A, 44B no longer allow reception of the transmitted radio waves sent by the RFID reader.

Figure 6:
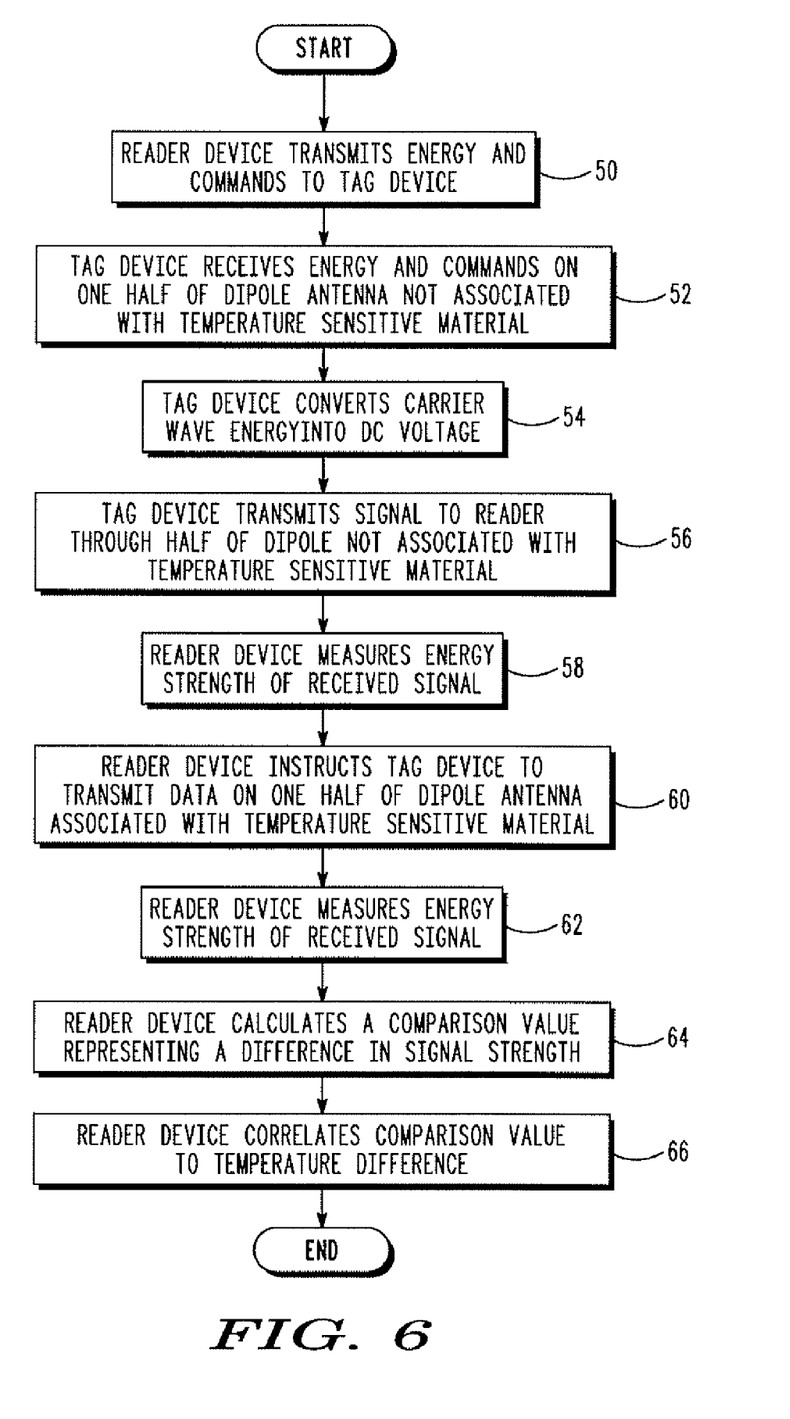
FIG. 6 is a flowchart of a method to determine a temperature level based on signal strength.

Referring now to FIG. 6, a method and system of detecting a temperature change using a tag device capable of using a plurality of antennas is disclosed. It will be appreciated by one skilled in the art that the above implementation uses a tag device integrated circuit designed to allow communication using one or more antennas.

As shown in FIG. 6, first, an RFID reader sends energy (e.g., a carrier signal) and commands to the tag device by modulation of a carrier signal 50. In one embodiment, upon receiving the carrier signal through one antenna not associated with the temperature sensitive material 52, the tag device converts the carrier signal into a DC voltage using a charge pump, rectifier circuit, or combination of both, or other energy transformation mechanisms thus allowing the tag to perform commands 54. The tag device then transmits data to the reader using the antenna that does not contain the temperature sensitive material 56, informing the reader a tag device is in the field. The reader then measures the tags signal strength (RSSI) of the data transmitted from the device's antenna without temperature sensitive material 58. The reader then instructs the tag device to transmit data using the antenna associated with the temperature sensitive material 60.

Next, the reader then measures the tags signal strength (RSSI) of the data transmitted from the device's radiator associated with the temperature sensitive material 62. In one embodiment, the reader sets a time interval for receiving the tag's signal and, if a signal does not arrive, the reader assigns a zero value for the signal strength.

In the system, the reader uses the value of the received signal strength from the non-temperature sensitive antenna as a reference value to be compared with temperature sensitive data (RSSI value) received from the temperature sensitive tag antenna. Using signals received from temperature sensitive and non-sensitive radiators (the RSSI values 64), the reader calculates a comparison value representative of a difference in signal strength. The RFID reader then correlates this comparison value to a temperature level the tag has been exposed 66. In one embodiment, the RFID reader is configured to include a reference data store that is used to correlate temperature values with difference in RF signal strength received from temperature sensitive and non temperature sensitive antennas.

Advantageously, as the antenna not associated with the temperature sensitive material is used as a reference, signal strength variation due to tag/reader coupling between the tag and the reader can be eliminated. Furthermore, as mentioned previously, the temperature sensitive material can be designed so that its impedance value varies versus the length of time the tag device has been at a particular temperature. For example, positioning the temperature sensitive material on only one antenna allows the signal strength of the transmit signal sent from the RFID tag device to vary as a function of the time that antenna has been exposed to a temperature. As such, using the present invention, RFID readers can now determine if tag devices have been exposed to a temperature in excess of a desired temperature without requiring RFID tags to have a continuous power source.

It will be appreciated by those skilled in the art that various RFID tags that do not use two antennas can also use the temperature sensitive material to detect temperature changes based on the tuning (resonance) of the antenna changing as well as detect changes in the gain of the antenna.

For example, by designing the antenna with sensor material such that the frequency shift that occurs is within the ISM frequency band, (U.S.: 902-928 MHz 500 kHz grids; E.U.: 865-868 MHz 200 kHz grids) standard EPC Gen 2 tags can be joined to an antenna which has the temperature sensing material associated with it.

For example, in one embodiment, the RFID tag antenna is designed such that the frequency of resonance prior to temperature exposure is 902 to 928 MHz (in the US) but upon the tag being exposed to a threshold temperature, the shift in the antennas resonance, due to temperature exposure, is 899.5 Mhz to 927.5 MHz. In the U.S. the RFID frequency band 902-928 is separated into frequency channels (52 channels) which an RFID reader randomly can hop through. This hopping by the readers advantageously keeps multiple readers from attempting to use the same frequency (colliding) when in the same physical area.

For example, in one embodiment, the RFID frequency band of 902-928 MHz is divided not into the fifty-two (52) channels but into ten (10) channels (2.6 MHz per channel). The tag's antenna is designed to operate from 902-928 MHz. As the antenna is associated with the temperature sensitive material, when the temperature has been exceeded, the tag's antenna frequency range shifts down to 899.4 to 925.4 MHz, thereby eliminating channel 10 from the frequency range of the tag. Accordingly, the tag "temperature exceeded" frequency range (899-925.4 MHz) no longer allows the tag to communicate on channel 10 (928 MHz).

In one embodiment, to determine if a tag has exceeded the temperature range, the RFID reader send commands to the RFID tag in channels 1-9 (902-925.4) and the tag responds since the tag's antenna operates within these channels. When the reader sends a command to the tag in channel 10 (928 MHz), since the tag's temperature exceeded resonance range is 899-925.4, the tag does not receive the reader's command at 928 MHz. Since the tag resonance no longer extends to 928 MHz, the tag does not respond (e.g., backscatter the carrier) back to the reader. Advantageously, this lack of tag communication can indicate that the frequency range of the tag has shifted as a result of the tag being exposed to a temperature level in excess of a threshold value.

In one embodiment, the reader performs a confirmation that the tag's antenna frequency range has shifted by sending a tag command between channels 9 and channel 10. As the tag receives the command in channel 9, the tag communicates back to the reader in channel 9. Since the tag can not receive commands in channel 10, however, the reader does not receive a response in channel 10 which confirms the temperature change.

Of course, it will be appreciated by one skilled in the art that the tag's shift in frequency due to temperature can be up or down and that the present invention is not limited to the use of ten channels.

Various features of the system may be implemented in hardware, software, or a combination of hardware and software. For example, some features of the system may be implemented in computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. An antenna apparatus comprising:
a first antenna tuned to a first resonant frequency to transmit and receive electromagnetic signals, said first antenna associated with a temperature sensitive material that, upon said apparatus being exposed to a particular temperature level over a predefined time interval, causes a shift in said first resonant frequency,
wherein upon said apparatus being exposed to said particular temperature level over said predefined time interval, a second antenna is configured to maintain an initial resonant frequency used by the first antenna.

2. The antenna apparatus of claim 1, wherein said temperature sensitive material is a low resistive material.

3. The antenna apparatus of claim 2, wherein said low resistive material is selected from the group consisting essential of a graphite-based composition, pentadecan and polyethylene glycol.

4. The antenna apparatus of claim 1, wherein upon said apparatus being exposed to said particular temperature level over said predefined time interval, a gain of said first antenna is changed.

5. The antenna apparatus of claim 1, wherein the second antenna is tuned to a second resonant frequency, said second antenna formed from a low resistive material such that, upon said apparatus being exposed to said particular temperature level over said predefined time interval, said second antenna maintains at least one of said second resonant frequency and a second antenna gain.

6. The antenna apparatus of claim 5, wherein said first and second antennas are arranged to form a dual dipole antenna.

7. The antenna apparatus of claim 1, wherein said first antenna is formed from said temperature sensitive material.

8. A Radio Frequency Identification (RFID) tag device comprising:
a substrate;
an integrated circuit mounted on said substrate; and
a first antenna in communication with said integrated circuit tuned to a first resonant frequency to transmit and receive electromagnetic signals, said first antenna associated with a temperature sensitive material that, upon said tag device being exposed to a particular temperature level over a predefined time interval, causes a shift in said first resonant frequency,
wherein upon said tag device being exposed to said particular temperature level over said predefined time interval, a second antenna is configured to maintain an initial resonant frequency used by the first antenna.

9. The RFID tag device of claim 8, wherein said temperature sensitive material is a low resistive material.

10. The RFID tag device of claim 9, wherein said low resistive material is a graphite-based composition.

11. The RFID tag device of claim 8, wherein upon said tag device being exposed to said particular temperature level over said predefined time interval, a gain of said first antenna is changed.

12. The RFID tag device of claim 8, wherein the second antenna is tuned to a second resonant frequency, said second antenna formed from a low resistive material such that, upon said tag device being exposed to said particular temperature level over said predefined time interval, said second antenna maintains at least one of said second resonant frequency and a second antenna gain.

13. The RFID tag device of claim 12, wherein said first and second antennas are arranged to form a dual dipole antenna.

14. The RFID tag device of claim 8, wherein said first antenna is formed from said temperature sensitive material.

15. The RFID tag device of claim 8, wherein said temperature sensitive material is a tuning element in communication with said first antenna.

16. The RFID tag device of claim 15, further comprising a plurality of tuning elements wherein each of said plurality of elements is associated with temperature sensitive material affected at a different temperature level to detect a range of temperatures.

17. A method of detecting a temperature change using electromagnetic waves comprising:
calculating a comparison value between a first signal strength value associated with a first signal received from an RFID tag device and a second signal strength value associated with a second signal received from said RFID tag device;

correlating said comparison value to a temperature difference, wherein correlating comprises:

comparing said comparison value to a plurality of signal strength values associated with a plurality of temperature points; and determining said temperature level based on said comparison.

18. The method of claim 17, comprising:

radiating said first signal from a first antenna included in said RFID tag device; and radiating said second signal from a second antenna included in said RFID tag device, said second antenna associated with a temperature sensitive material that, upon said tag device being exposed to a particular temperature level over a predetermined period of time, causes at least one of said second signal strength to be different from said first signal strength and a second resonant frequency of said second antenna to be different from a first resonant frequency of said first antenna.

19. A Radio Frequency Identification (RFID) system comprising:

an RFID tag device configured to send a first signal including a first signal strength value and a second signal including a second signal strength value in response to at least one request; and a RFID reader device configured to send said at least one request to said RFID tag device, said reader device configured to i) calculate a comparison value between said first signal strength value associated with said first signal received from said tag device and said second signal strength value associated with said second signal, and ii) correlate said comparison value to a temperature level, wherein correlating comprises:

comparing said comparison value to a plurality of signal strength values associated with a plurality of temperature points; and determining said temperature level based on said comparison.

20. The system of claim 19, wherein said tag device:

radiates said first signal from a first antenna; and radiates said second signal from a second antenna, said first and second antennas included in said RFID tag device, said second antenna associated with a temperature sensitive material that, upon said tag device being exposed to a particular temperature level over a predetermined period of time, causes at least one of said second signal strength value to be different from said first signal strength value and a second resonant frequency of said second antenna to be different from a first resonant frequency of said first antenna.

21. An RFID tag device comprising:

a substrate;

an integrated circuit;

an antenna in communication with said integrated circuit and associated with a temperature sensitive material, said antenna operable in a first frequency band comprising a first number of communication channels, wherein, upon said tag device being exposed to a particular temperature level, said temperature sensitive material causes said antenna to operate in a second frequency band, said second frequency band comprising a second number of communication channels, said second number of communication channels being different from said first number of communication channels.

22. A method comprising:

sending a command to an RFID tag device over each of an N number of communication channels, said RFID tag device including an antenna associated with a temperature sensitive material that operates to affect a frequency of at least one of said N number of communication channels upon said tag being exposed to a particular temperature level, N being an integer value greater than 1;

receiving a response to said command over each of N−1 communication channels, said N−1 communication channels not including said at least one communication channel affected by said temperature sensitive material; and identifying an exceeded temperature range for said RFID tag based upon receiving said response over each of said N−1 communication channels and non-receipt of said response over said at least one communication channel affected by said temperature sensitive material.

* * * * *

UNITED STATES PATENT AND TRADEMARK OFFICE
CERTIFICATE OF CORRECTION

| | | |
|---|---|---|
| PATENT NO. | : 8,228,172 B2 | Page 1 of 1 |
| APPLICATION NO. | : 12/241469 | |
| DATED | : July 24, 2012 | |
| INVENTOR(S) | : Collins et al. | |

It is certified that error appears in the above-identified patent and that said Letters Patent is hereby corrected as shown below:

In Column 6, Line 46, delete "Lag" and insert -- tag --, therefor.

Signed and Sealed this
Eighth Day of January, 2013

David J. Kappos
*Director of the United States Patent and Trademark Office*